United States Patent [19]

Ono et al.

[11] Patent Number: 4,464,740
[45] Date of Patent: Aug. 7, 1984

[54] SEPARATION BAND DETECTING CIRCUIT IN AN AUTOMATIC PROGRAM SELECTION RECORD PLAYER

[75] Inventors: Tsuyoshi Ono, Yamato; Fumiaki Ohno, Fujisawa, both of Japan

[73] Assignee: Victor Company of Japan, Ltd., Yokohama, Japan

[21] Appl. No.: 377,846

[22] Filed: May 13, 1982

[30] Foreign Application Priority Data

May 18, 1981 [JP] Japan ............................ 56-74618

[51] Int. Cl.³ .................... G11B 3/38; G11B 17/06
[52] U.S. Cl. ................................. 369/41; 369/33; 369/216; 369/231
[58] Field of Search ............... 369/41, 33, 216, 231, 369/233

[56] References Cited

U.S. PATENT DOCUMENTS

| 4,093,832 | 6/1978 | Isaacson et al. | 369/41 |
| 4,361,880 | 11/1982 | Kitamura et al. | 369/41 |
| 4,375,092 | 2/1983 | Yoshio | 369/41 |
| 4,375,093 | 2/1983 | Takahashi | 369/41 |
| 4,398,278 | 8/1983 | Suzuki | 369/41 |
| 4,412,318 | 10/1983 | Goto | 369/41 |

FOREIGN PATENT DOCUMENTS 1514921 6/1978 United Kingdom .
1547913 6/1979 United Kingdom .

Primary Examiner—Steven L. Stephan
Attorney, Agent, or Firm—Louis Bernat

[57] ABSTRACT

A separation band detecting circuit is used in an automatic program selection record player which has a photodetector which moves together with a tone arm and comprises a light-emitting element for emitting light against the surface of the record and a photosensitive element for receiving the light reflected at the record surface and producing an output in accordance with the light quantity of the received reflected light. The detecting circuit comprises an operational amplifier supplied with the output of the photodetector to its one input terminal, and a time constant circuit connected to the other input terminal of said operational amplifier, for giving a threshold level with respect to the operational amplifier and giving a time constant with respect to the level fluctuation in the threshold value. The time constant circuit varies the threshold level with a time constant, according to an input signal level to the one input terminal of the operational amplifier. The operational amplifier inverts its output when the relationship between amplitudes of the input signal level and the threshold level reverses.

6 Claims, 9 Drawing Figures

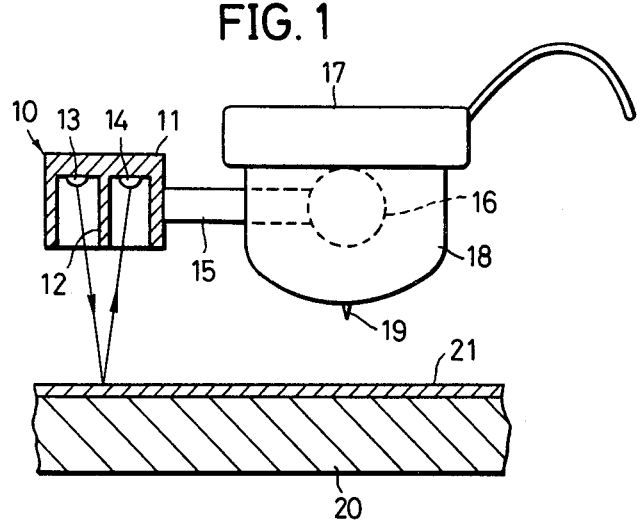
FIG. 1
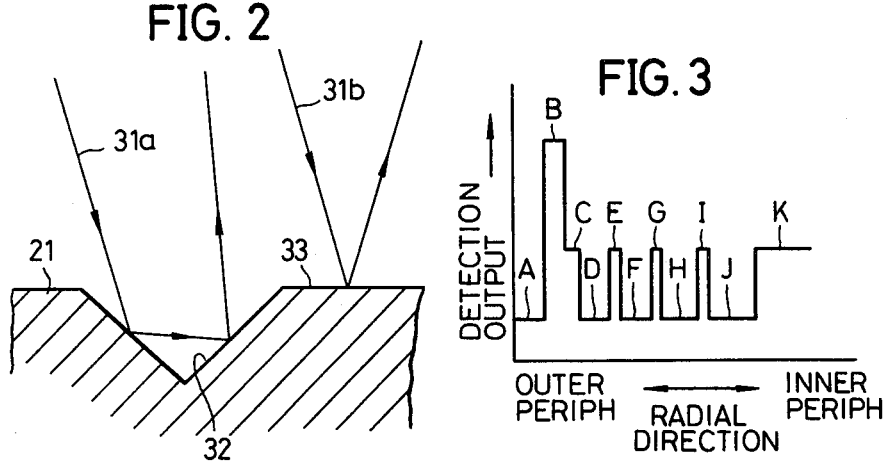
FIG. 2
FIG. 3
FIG. 4 PRIOR ART

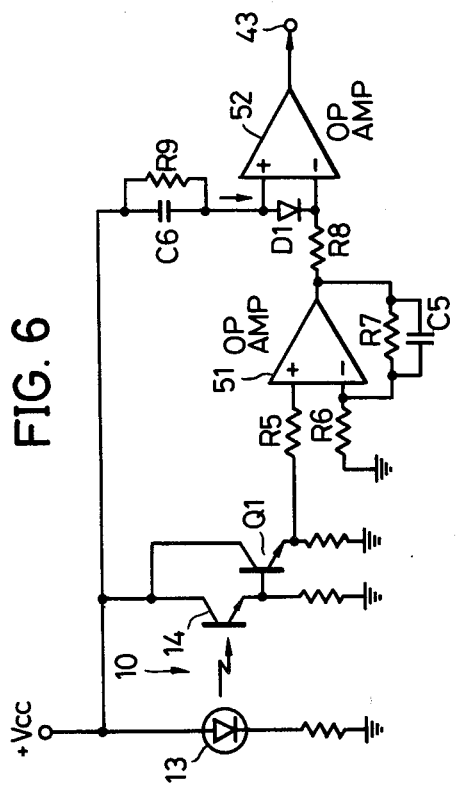
FIG. 6
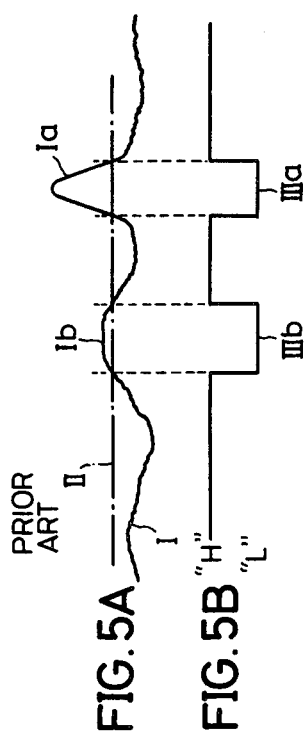
FIG. 5A PRIOR ART
FIG. 5B
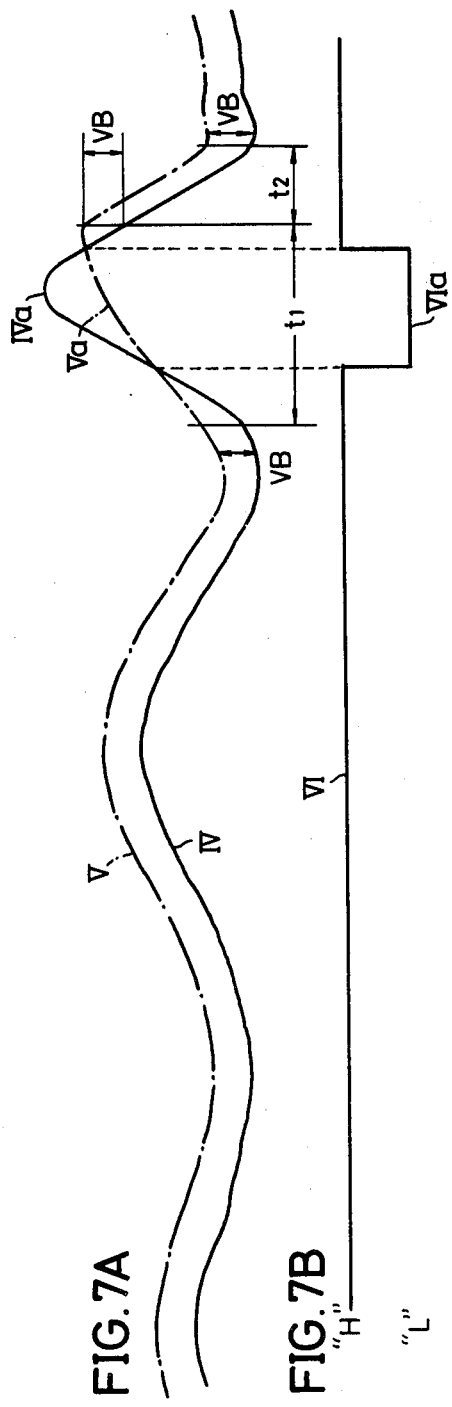
FIG. 7A
FIG. 7B

SEPARATION BAND DETECTING CIRCUIT IN AN AUTOMATIC PROGRAM SELECTION RECORD PLAYER

BACKGROUND OF THE INVENTION

The present invention generally relates to separation band detecting circuits in automatic program selection record player, and more particularly to a separation band detecting circuit used in an automatic program selection record player, capable of positively detecting separation bands on the record without being affected by external disturbance, noise, and the like.

Generally, a record contains plural pieces or programs of music, for example, on the same side of the record, and two consecutive pieces of music are separated from each other by a coarse groove portion. This coarse groove portion is the so-called separation band, and this separation band contains no recorded information. The separation bands are provided not only for providing a short interval between pieces of music, but also for facilitating the placement of a stylus of a phonograph or pickup cartridge on the record, so that a desired piece of music can be played back. However, in order to select and play the desired piece of music, the stylus of the pickup cartridge must be placed within the separation band, just prior to the desired piece of music. This selective placement of the stylus requires skill on the part of the operator who operates the record player. This is because the width of the separation band is relatively narrow, and the stylus may easily be erroneously placed on a wrong position. When the pickup arm is manipulated manually, for example, the stylus may be placed onto a fine-groove portion where the music is recorded, and the stylus and/or the record grooves may become damaged.

Recently, programmable automatic record players have been developed to eliminate the above described problems. In such a programmable automatic record player, the position of the pickup arm is detected by means using a photosensor. The pickup arm is automatically moved to the position of a desired piece of music which has been programmed, according to a command signal corresponding to the position of the pickup arm. Thus, the desired piece of music can be played back automatically. In this type of an automatic record player, the separation bands are detected and the number of these separation bands are counted, in order to detect the position of the pickup arm with respect to the recorded pieces of music. A device for performing such detection comprises a photodetector and a separation band detecting circuit.

As will be described hereinafter in conjunction with the accompanying drawings, the above photodetector comprises a light-emitting element and a photosensitive element. The light emitted from the light-emitting element is reflected at the surface of the record, and the reflected light is received at the photosensitive element. The manner in which the light is reflected differ in the fine-groove portions wherein a program signal of the music is recorded and the separation bands wherein no signal is recorded. Hence, the intensity of the light received by the photosensitive element differs according to whether the light is reflected at the fine-groove portion or the separation band. The change in the intensity of the received light is detected by the separation band detecting circuit, and the separation band is accordingly detected.

However, as will be described hereinafter in conjunction with the accompanying drawings, the conventional separation band detecting circuit has a disadvantage in that the separation band detecting circuit may be affected by external disturbance, noise, and the like, to perform erroneous detection. Generally, the record surface is not flat, and warps and undulations are introduced when the record is formed. Moreover, according to the magnitude of the recorded sound level, the width of the groove and the pitch of the groove vary. Furthermore, according to the state in which the record player is used, external light may reflect at the record surface. In this case, the reflected external light may reach the photosensitive element. Due to the various causes described above, the intensity of the light reaching the photosensitive element does not change between two values, between the recorded groove portion and the unrecorded groove portion in the separation band. That is, in reality, the light reaching the photosensitive element includes a noise component and a drift component which varies gradually. Thus, according to the setting of the threshold value of the separation band detecting circuit, the detecting operation may be affected by the above noise component and the drift component. In such a case, the separation band detecting circuit will erroneously detect a separation band although there is no such separation band.

SUMMARY OF THE INVENTION

Accordingly, it is a generaly object of the present invention to provide a novel and useful separation band detecting circuit in an automatic program selection record player, in which the above described disadvantages have been overcome.

Another and more specific object of the present invention is to provide a separation band detecting circuit in an automatic program selection record player, in which the threshold value of an operational amplifier for detecting the separation band varies according to a drift component, and a response with respect to a sharp change in a detected input signal varies gradually. According to the detecting circuit of the present invention, only the separation bands are accurately detected, without performing an erroneous detecting operation due to external disturbance, noise, and the like.

Other objects and further features of the present invention will be apparent from the following detailed description when read in conjunction with the accompanying drawings.

BRIEF DESCRIPTION OF THE DRAWINGS

FIG. 1 is a front view with a part in cross section, showing an example of a photodetector which operates together with a separation band detecting circuit according to the present invention;

FIG. 2 is a diagram for explaining the reflecting state of a light from a light-emitting element of a photodetector, at the record surface;

FIG. 3 is a graph showing the change in the detected output of a photodetector when the photodetector is moved along the radial direction of the record;

FIG. 4 is a circuit diagram showing a conventional separation band detecting circuit;

FIGS. 5A and 5B respectively show signal waveforms for explaining the operation of the conventional circuit shown in FIG. 4;

FIG. 6 is a circuit diagram showing an embodiment of a separation band detecting circuit according to the present invention; and FIGS. 7A and 7B respectively show signal waveforms for explaining the operation of the circuit shown in FIG. 6.

DETAILED DESCRIPTION

First, description will be given with respect to a photodetector in an automatic program selection record player, which operates together with a separation band detecting circuit, by referring to FIGS. 1 through 3.

As shown in FIG. 1, a photodetector 10 comprises a casing 11 having a separating wall 12, a light-emitting element 13 provided at an inner part of the casing 11, and a photosensitive element 14 comprising a phototransistor provided at the inner part of the casing 11 separated by the separating wall 12. The casing 11 is fixed to a tone arm 16 through a connecting part 15. A cartridge 18 having a reproducing stylus 19, is mounted to a head shell 17 which is fixed to the tone arm 16. The relative positions of the reproducing stylus 19 and the photodetector 10 are always constant, above a record 21 which is placed onto a turntable 20.

The light from the light-emitting element 13 of the photodetector 10 is reflected at the surface of the record 21, and the reflected light is received at the photosensitive element 14. The reflecting state of the light emitted from the light-emitting element 13 at the surface of the record 21, is shown in FIG. 2. When a light 31a hits a groove 32 of the record 21, the light reflected at the groove 32 does not travel towards the photosensitive element 14. Accordingly, when the light hits a part of the record 21 where the number of sound grooves 32 is large, only an exceedingly small quantity of reflected light reaches the photosensitive element 14. On the other hand, when a light 31b hits a part of the record 21 where majority of this part is a flat portion 33 such as an unrecorded groove, lead-in groove, and lead-out groove, majority of the light reflected at the flat portion 33 travel towards the photosensitive element 14. Here, the diameter of the spot formed by the light is two to three milimeters, for example.

Accordingly, when the tone arm 16 is angularly rotated horizontally from a resting position at the outer side of the turntable 20 to an innermost peripheral position of the record, the detected output of the photosensitive element 14 becomes as shown in FIG. 3. In FIG. 3, the vertical axis indicates the detected output, and the right and left sides along the horizontal axis respectively indicate the inner peripheral direction and the outer peripheral direction on the record 21. A part A indicates the detected output of the photosensitive element 14 when the light emitted from the light-emitting element 13 hits a motor board surface, and a part B indicates the detected output of the photosensitive element 14 when the light hits the surface of the turntable. Similarly, parts C, E, G, and I indicate the detected output when the light hits the unrecorded parts (separation bands) between recorded programs, and parts D, F, H, and J indicate the detected output when the light hits the recorded parts on the record 21.

Description will now be given with respect to an example of a conventional separation band detecting circuit which operates together with the above photodetector 10 and detects the above parts B, C, E, G, I, and K, by referring to FIG. 4. A photo-excitation current introduced when the light emitted from the light-emitting element 13 is reflected at the record and reaches the photosensitive element 14 (shown as a phototransistor in FIG. 4), is supplied to the base of a transistor Q1 which is connected to form an emitter-follower. Hence, impedance conversion is performed at this transistor Q1. An emitter output of the transistor Q1 is supplied to an inverting input terminal of a first operational amplifier 41, through a capacitor C1. A variable resistor R1 and a capacitor C2 are connected in parallel in a negative feedback path, between the output of the operational amplifier 41 and the inverting input terminal of the operational amplifier 41. A low-frequency component of the input signal is eliminated by the above capacitor C1. Moreover, sharp pulse noise is eliminated by the operational amplifier 41 having the negative feedback.

The output of the operational amplifier 41 is supplied to an inverting input terminal of a second operational amplifier 42. A variable resistor R2 and a resistor R3 which determine the threshold value, are connected to a non-inverting input terminal of the operational amplifier 42. As shown in FIG. 5A, during a period in which an input signal level I at the inverting input terminal of the operational amplifier 42 is lower than a threshold level II at the non-inverting input terminal of the operational amplifier 42, the output signal level of the operational amplifier 42 obtained through an output terminal 43 is of high level (H-level) as shown in FIG. 5B. However, when the input signal level I exceeds the threshold level II as shown in FIG. 5A, the output signal level of the operational amplifier 42 becomes of low level (L-level) as shown in FIG. 5B.

When the light from the light-emitting element 13 is reflected at the separation band on the record, the input signal level I sharply increases as indicated by Ia in FIG. 5A. Hence, due to the existence of a L-level output part IIIa shown in FIG. 5B, the separation band is accordingly detected. However, as described above, the input signal level I corresponding to parts other than the separation band also comprises a drift component and fluctuates as shown in FIG. 5A, that is, not stable, due to effects such as surface configuration of the record, width of the groove, pitch of the groove, and external disturbing light. This fluctuation component is eliminated to a certain extent at the capacitor C1, but this component is not sufficiently eliminated. Hence, when the input signal level exceeds the threshold level II as indicated by Ib in FIG. 5A due to the above described fluctuation, the output of the operational amplifier 42 becomes of low level as indicated by IIIb in FIG. 5B, and performs an erroneous detecting operation.

If the variable resistor R2 is adjusted to increase the threshold level II so as to reduce the chances of this erroneous detecting operation from being performed, the actual separation bands cannot be detected positively. On the other hand, if the threshold level II is reduced so as to positively detect the actual separation bands, the above described erroneous detecting operation may be performed due to the above drift component. In addition, the setting of the threshold level is troublesome to perform.

The present invention has overcome the above described disadvantages, and an embodiment of a separation band detecting circuit according to the present invention is shown in FIG. 6. In FIG. 6, those parts which are the same as those corresponding parts in FIG. 4 are designated by the same reference numerals, and their description will be omitted.

The emitter output of the transistor Q1 is supplied to a non-inverting input terminal of a first operational amplifier 51, through a resistor R5. An inverting input terminal of the operational amplifier 51 is grounded through a resistor R6. A parallel circuit comprising a resistor R7 and a capacitor C5, is connected in a negative feedback path between the output and the inverting input terminals of the operational amplifier 51.

The output of the operational amplifier 51 is supplied to an inverting input terminal of a second operational amplifier 52, through a resistor R8. A parallel circuit comprising a resistor R9 and a capacitor C6, is connected between a non-inverting input terminal of the operational amplifier 52 and a power source +Vcc. In addition, a diode D1 is connected in the forward direction, between the non-inverting input terminal and the inverting input terminal of the operational amplifier 52.

By the construction with the above described connections, a level V at the non-inverting input terminal of the operational amplifier 52 normally follows and varies with a biasing voltage VB which is equal to the forward voltage of the diode D1, with respect to fluctuations in a level IV at the inverting input terminal, as shown in FIG. 7A. The level V follows and varies with respect to the fluctuations in the level IV, with a time constant determined by the capacitor C6 and the resistor R9 upon charging, and with a time constant determined by the capacitor C5 and the resistor R7 upon discharge. Accordingly, during the period in which the signal level IV supplied to the inverting input terminal of the operational amplifier 52 fluctuates by a relatively small quantity with a period longer than the time constant determined by the above capacitor C6 and the resistor R9, the threshold level V at the non-inverting input terminal fluctuates with respect to the level IV with a constant level difference VB. Thus, the level IV never exceeds the level V. Therefore, the output of the operational amplifier 52 remains at high level as shown in FIG. 7B.

When the photodetector 10 reaches a position opposing a separation band on the record, the input level IV at the inverting input terminal of the operational amplifier 52 sharply increases to a high level as indicated by IVa in FIG. 7A. Moreover, the threshold level at the non-inverting input terminal of the operational amplifier 52 also increases as indicated by Va and follows the fluctuations in the level IV, because the capacitor C6 is charged according to a time constant t1 determined by the capacitor C6 and the resistor R9. However, the increase in the input level indicated by the part IVa, is sharper than the increase in the level indicated by the part Va having the time constant determined by the capacitor C6 and the resistor R9. Thus, the input level IV (IVa) becomes higher than the threshold level V (Va). An output level VI of the operational amplifier 52 becomes of low level as indicated by VIa in FIG. 7B.

As described above, when the level IV at the inverting input terminal exceeds the level V (threshold level) at the non-inverting input terminal, the diode D1 is turned OFF. During the period in which the level IV is higher than the level V, the output of the operational amplifier 52 remains at low level, and the diode D1 remain in the OFF state.

Beyond the peak in the input signal, where the input signal level IV (IVa) becomes lower than the threshold level V (Va), the output of the operational amplifier 52 returns to the high level. Furthermore, when the difference between the levels V and IV becomes equal to the forward voltage VB of the diode D1, discharge takes place through the diode D1, with a time constant t2 which is determined by the capacitor C6 and the resistor R8, since the output impedance of the operational amplifier 51 can be considered as being zero. Thus, the level V again follows and varies with respect to the fluctuations in the level IV, with the level difference voltage VB.

Accordingly, the level IV exceeds the threshold level V and the output of the operational amplifier is inverted, only when the input signal level IV sharply changes according to the separation band, with respect to the above charging time constant t1. For the other cases where the input signal level IV gradually varies, the threshold level IV sufficiently follows and varies with respect to the level IV. Hence, in these other cases, the level IV never exceeds the level V, and an erroneous detecting operation is prevented from being performed. In addition, it is not necessary to provide the capacitor C1 to eliminate the low-frequency component as in the conventional case.

The detected output obtained from the output terminal 43 is supplied to a micro-computer provided at a succeeding stage. As in the conventional apparatus, the detected output is similarly used to perform an automatic program selection in the record player.

Numerical examples of constants for the essential circuit elements in the circuit shown in FIG. 6 will now be given. For example, $R8 = 1$ K$\Omega$, $R9 = 1$ M$\Omega$, and $C6 = 0.047$ $\mu$F. In order to suitably set the biasing voltage VB, a plurality of diodes may be connected in series, instead of using the diode D1. Moreover, a Zener diode of a suitable value may be used. In the present embodiment of the invention, the biasing voltage VB due to the diode D1, is 0.7 volts. In a concrete application, four diodes may be connected in series, to set the biasing voltage to 2.8 volts. Further, the above time constant t1 is selected to a value in a range between 5 miliseconds and 50 miliseconds. For example, t1 = 10 miliseconds. On the other hand, the time constant t2 is selected to a value in a range between 0.01 miliseconds and 0.5 miliseconds, that is, 0.05 miliseconds, for example.

As a modification of the above described embodiment, the output of the operational amplifier 51 may be connected to the non-inverting input terminal of the operational amplifier 52. In this case, the capacitor C6 and the resistor R9 is connected to the inverting input terminal of the operational amplifier 52. In this modification of the invention, the output of the operational amplifier 52 has a waveform which is an inverted waveform of the output shown in FIG. 7B.

In addition, if the first operational amplifier 41 which is supplied with the output of the transistor Q1 to its inverting input terminal as in the conventional example shown in FIG. 4 is used as the first operational amplifier, the output of this first operational amplifier is connected to the non-inverting input terminal of the operational amplifier 52. Moreover, the capacitor C6 and the resistor R9 are connected between the inverting input terminal of the operational amplifier 52 and ground.

In the above embodiment of the invention, description was given for the case where the tone arm is moved to the inner peripheral direction of the record from the resting position at a relatively high speed, the number of separation bands is detected, and the detected number of separation bands is counted, in order to select a desired program and start playing from the set desired program. But there are cases where it is desirable to detect the separation bands while playing the record. In this case, the movement of the tone arm is quite slow, since the stylus is guided by the groove of the record. Thus, the rise in the level of the detected signal supplied to the operational amplifier 52 is gradual. Accordingly, the rise in the threshold level follows the rise in the level of the input signal, and the input signal level cannot exceed the threshold level. Therefore, accurate detection can not be performed in some cases. Hence, in such a case, additional capacitance and resistance is provided by the switching of an analog switch and the like, with respect to the charging circuit comprising the capacitor C6 and the resistor R9. Switching is performed to increase the time constant.

Further, the present invention is not limited to these embodiments, but various variations and modifications may be made without departing from the scope of the present invention.

What is claimed is:

1. A circuit for detecting separation bands between bands recorded on a record, said detecting circuit being in an automatic program selection record player, said record player having a photodetector and a tone arm which move together, said photodetector having a light-emitting element for directing light against the surface of the record and a photosensitive element for receiving the light which is reflected from the record surface and for producing an output signal which is in accordance with quantity of the reflected light which is received by said photosensitive element, said detecting circuit comprising:

an operational amplifier having first and second input termnals, said first input terminal being supplied with the output signal of said photodetector, said output signal including a D.C. component; and a time constant circuit having a predetermined time constant and including a diode which is coupled between said first and second input terminals of the operational amplifier, said second input terminal being coupled through said time constant circuit to a potential source;

means including said time constant circuit for supplying a threshold voltage to said second input terminal of the operational amplifier, said threshold voltage undergoing a gradual voltage level change with said predetermined time constant to follow a voltage level change in the output signal of said photodetector, and means including said operational amplifier for inverting an output signal in response to a sudden large level change in the output signal of said photodetector, said sudden large level change occurring with a period which is shorter than said predetermined time constant and accompanying a voltage change to a voltage level which exceeds the level of said threshold voltage.

2. The detecting circuit as claimed in claim 1 in which said first and second input terminals respectively are inverting and non-inverting input terminals of said operational amplifier, and said time constant circuit comprises: a charging and discharging capacitor coupled to the non-inverting input terminal of said operational amplifier; a first resistor coupled in parallel with said capacitor, for determining a charging time constant together with said capacitor; and a second resistor coupled to the inverting input terminal of said operational amplifier, for determining a discharging time constant together with said capacitor, said predetermined time constant being the charging time constant of said time constant circuit.

3. The detecting circuit as claimed in claim 2 in which said diode is connected in the forward direction from the non-inverting input terminal to the inverting input terminal of said operational amplifier.

4. The detecting circuit as claimed in claim 2 in which said diode has a predetermined biasing voltage, and said threshold voltage follows the voltage level change in the output signal of said photodetector with a voltage difference which is equal to said predetermined biasing voltage.

5. The detecting circuit as claimed in claim 1 in which said predetermined time constant of the time constant is variably set according to the operational mode of the record player so that the output signal of said photodetector exceeds said threshold voltage when said photosensitive element receives the light which is reflected from a separation band on the record surface.

6. The detecting circuit as claimed in claim 2 in which said charging time constant is a value in a range of approximately 5 milliseconds to 50 milliseconds, and said discharging time constant is a value in a range of substantially 0.01 milliseconds to 0.5 milliseconds.

* * * * *